United States Patent [19]
Graybill

[11] 3,888,768
[45] June 10, 1975

[54] OIL RECTIFIER, APPARATUS WITH PROCESS

[76] Inventor: Paul J. Graybill, 61 Sunset Hill Dr., Pine Orchard, Conn. 06405

[22] Filed: June 15, 1973

[21] Appl. No.: 370,282

[52] U.S. Cl................................. 210/223; 210/304
[51] Int. Cl............................................ B01d 43/00
[58] Field of Search....... 210/73, 84, 130, 187, 304, 210/223, 512

[56] References Cited
UNITED STATES PATENTS

| | | | |
|---|---|---|---|
| 3,462,720 | 8/1969 | Mlyata........................... | 210/223 X |
| 3,529,719 | 9/1970 | Graybill.......................... | 210/304 X |

*Primary Examiner*—Frank A. Spear, Jr.

[57] ABSTRACT

A Rectifer with process for treating contaminated liquid emulsions, including motor oil, using several physical functions and chemical processes in one environment, employing various metals and alloys as fixtures to neutralize acid and molecular water, catalyze gums, resins, sulphur, and various carbonaceous contaminants, to electrostatically ionize and attract and surface cohere adsorbent colloids, separate solid contaminants and globular water by sedimentation, centrifugal and inertial forces, in laminar, parabolic and jet flow streams, to agglomerate submicronic contaminants by the Van der Waals effect, the Brownian movement and gravitation and to magnetically attract ferrous contaminants, thus separating the dispersed phase from the continuous phase thereof.

7 Claims, 6 Drawing Figures

OIL RECTIFIER, APPARATUS WITH PROCESS

RELATED PATENTS AND PATENT APPLICATIONS

This application discloses certain improvements and variations on the Apparatus and Process disclosed in my previous U.S. Pats. No. 3,450,264, June 17, 1969 and No. 3,529,719, Sept. 22, 1970 and on my patent application, Ser. No. 225,726 filed Feb. 14, 1972, which is now abandoned.

This application adds to the previous cited structures a more positive centrifuging means in the form of a louvered cap which is positioned over the upper terminals of the inlet flow tube and the outlet flow tube which later is also covered by a shield cone with flange, said flange sealing off the inlet chamber at its lower extremity. As new material, it adds vertically staggered apertures in the concentric corrugated attractors thus increasing the downward thrust of inertial forces in dislodging heavy contaminants. It also adds a shunt shield having a multiple number of small bottomly opened lowers therein, positioned about the attractor element, this screen to insure the deflection of contaminants that are thrust downwardly from the flow stream as it passes about the ball race flange in a 180° turn thus still allowing excess fluid which has not made the turn to penetrate therethrough and join the main flowstream as it passes through the apertures in the attractors immediately inwardly therefrom. Also added is a series of helical-spring contained magnets positioned in the doughnut shaped sweep chamber between the shunt shield and the container wall and in close proximity to the lower edge of the ball race flange, near which all flow must pass, these so deployed as to magnetically attract any ferrous material from the flow stream, and finally it adds a means of mounting externally the porous sand screen filter which was positioned internally in the previous structure, this by means of a sandwich type full-flow adaptor plate, positioned between the motor or machine mount and the standard porous filter which plate directs the full flow through the Rectifier and back through the standard porous filter which can be used in extreme conditions or circumstances.

BACKGROUND OF THE INVENTION

The cleaning of oil has always been a major problem in industry and transportation. The problem is widespread and difficult, ranging all the way from in-line oil cleaning in the oil fields to remove bottom settlings, to inline oil cleaning in industrial shop machines to remove metal chips, dirt and water, and to oil burner lines to remove dirt, water, rust, and fibers, and to compressor and hydraulic systems to remove water and all abrasive contaminants down to the 2-5 micron level and finally to internal combustion motors to remove or destroy acid, gums and resins, dirt, carbon, molecular water, globular water, metal chips or any other detrimental contaminants.

In the case of machine and hydraulic systems excellent oils have been developed to insure long life in the system if the oil can be kept clean and in motors excellent oils and additives have been used to help overcome some of the problems involved, again if it can be kept clean.

A great number of devices have been developed and used to clean the various types of oil in these various uses, such as settling tanks, centrifuges, edge-type filters, cintered metal filters, conglomerate element filters and porous paper element filters. Each of these have been partially successful but also each has its faults and shortcomings, for the particular use at hand; none has been highly successful.

SETTLING TANKS, by virtue of their size, have been limited to oil field or machine shop use where space is available but have not been highly efficient even in these uses, since the settling time in some cases is too great and because of their inability to remove contaminants of very small micron sizes or very low specific gravity, without heating the oil to a very high heat and even then some contaminants cannot be removed without the use of chemical coagulants and dispersants.

Likewise, CENTRIFUGES can be used successfully only in very limited operations, by virtue of their need for powered operation and constant care and cleaning, also they are largely by-pass cleaners and can clean only part of the total oil flow which in the case of certain hydraulic systems and motors allows the greater part of the oil to circulate through the system without being cleaned. They are also costly to install and maintain since they have to be driven at very high speeds and have to be frequently dismantled and washed in a solvent; hence they are not in general practical use, even though they remove contaminants successfully down to the proper micron levels.

The EDGE FILTER cannot generally remove particles below 40–100 microns in size and are therefore the least desirable for most uses. These filters require continuous or intermittent sweeping of their edges to remove the captured contaminants, and since these dislodged contaminants are not actually removed from the flow stream but are merely swept off the edges of the filters back into the oil; they are as a consequence immediately recirculated into the filter, thus causing reclogging. They are not used in many types of applications.

CONGLOMERATE MEDIA FILTERS are widely used, but usually as by-pass filters in conjunction with full-flow filters of other types, used alone, they are not adequate since a large portion of the oil circulates without filtration. They throw the burden of direct filtration on another type of filter, and should be classed as dirt catchers rather than filters since they catch the dirt from a small by-pass oil stream as it passes through the contained bag of shredded paper or the like and need frequent changing and cleaning.

PLEATED PAPER FILTERS, which are perhaps the most widely used as full flow filters, because of their low cost and convenience, are also not fully acceptable because of their inefficiency, their clogging, and need for frequent change and their material and labor costs. They rarely have an absolute micron rating below 15-20 microns and consequently allow some of the most destructive contaminants to pass freely therethrough. They also clog readily causing the greater portion of the oil to by-pass going directly to the machine or motor without any filtration. Their active life is short, their rating is low, their capacity is limited, and all in all they do not prevent the shortening of machine and motor life to any great extent. Some 3-5 micron filters are available, but are impractical in general use because of clogging, short life, and high price.

The cintered metal, edge type, conglomerate media and pleated paper filters are generally classed as porous filters, and they all have in common the problem of clogging since they are based on porosity, the more efficient they are, the worse they clog and consequently the more they by-pass the oil without filtration. They cannot be used without a by-pass valve and are not thus sufficiently effective in machine and motor operations because of this clogging and by-passing and the resultant back pressure, which robs motors, for instance, of sufficient oil to prevent valve noises and motor failures, to say nothing of their inefficiency in filtering down to the necessary 2–5 micron level to prevent wear, their efficiency is never below the range of 15–100 microns depending on the type.

In reality then, especially for motor or hydraulic system operations, their usefulness in removing the larger abrasive material is in itself very limited, and the removal of such contaminants is only a small part of the proper treatment of oil for such uses. Perhaps the most important functions of an oil cleaner or rectifier is to remove the sub-micronic contaminants that are present in oil especially in motors and hydraulic systems. In motors these are created in the combustion cycle as carbon, ash, etc., and are the most important contaminants of all since they are the cause of carbon deposits and build-up which with gums and resins and other materials which when not removed, neutralized, or otherwise destroyed, accumulate and are hardened in hot spots in the motor to form the very destructive abrasives and other materials which then if not removed down to the 2 micron level will destroy a motor. These sub-micronic contaminants are not sufficiently removed by these porous filters.

Thus, especially for motors and hydraulic systems, porosity when used alone, would then seem to be the wrong principle for keeping oil clean and in good lubricating quality. The real answer would be to constantly rectify the oil sufficiently well to prevent this build-up and the formation of these contaminants in the first place. Actually if the oil is constantly being rectified the only real problem then is to prevent foreign abrasives from the air and other sources from entering the oil system since virtually no large abrasives will be created or be present in the motor or system except in cases of metal failure and disintegration from fatigue as is true with existing practice. It should also be noted here that there are a number of important factors in maintaining good lubricating quality in motor oil, and cleanness in industrial oils, other than the removal of abrasives, which none of the previously considered cleaning devices are able to solve.

1. They do not neutralize acid.
2. They do not destroy molecular water which in itself is the chief cause of emulsification of oil and the creation of acid as well as sludge.
3. They do not otherwise prevent the formation and accumulation of sludge in the motor, since clean oil has a washing action.
4. They do not remove globular water in volume.
5. They do not catalyze gums and resins, or assist in preventing their formation.
6. They do not cool the oil, thus do not in this way assist in the prevention of the formation of gums and resins.
7. They do not positively remove ferrous materials by magnetic attraction.
8. They (the pleated paper elements) do not prevent the passing of the circulating oil through a porous contaminated medium with the attendant danger of bursting the medium and/or picking up agglomerated contaminants and fibers, which contaminants are then forced directly into the working parts of the motor.
9. They do not effectively prevent excessive wear in the motor or machines in which case frequent overhauls are necessary.
10. They do not take advantage of the improvement of the quality of the oil by the continuous re-refining process of oxidizing the short and loose ends of the hydrocarbon chain which naturally takes place in the motor and adds to its viscosity, its oiliness, its greasiness, its film strength, and its resistance to heat since the oil is not kept clean and it loses its film strength.
11. They do not increase the horsepower of the motor by preventing blow-by or improve the consumption rate of fuel since they do not allow long use of clean oil to build up its film strength and viscosity.
12. They do not prevent the greater portion of blow-by past the rings from the combustion chamber and consequently the pollution of the air, which prevention results from the build up of the oil quality in long use if kept clean.
13. They do not extend the life of a motor perhaps as much as 100–200% or more as does the instant rectifier when the oil is properly treated.
14. They do not obviate the frequent changing of the crankcase oil and filters or filter elements with its cost and labor.

It would seem then that an oil cleaner base on porosity alone is entirely inadequate and that an apparatus and process which would correct or supplement in extreme cases these shortcomings of the porous filters and do what these fail to do would materially add to life of the oil and the equipment. The correction of some of the inadequacies of porous filters is just as important in keeping oil in good lubricating quality as is removing certain special filterable contaminants, these are neutralizing acid and molecular water and removing sub-micronic carbon, dirt, and iron particles.

SUMMARY OF THE INVENTION

With these facts in mind the instant rectifier, with process, was developed over a period of years employing any and all physical and chemical functions and processes which would overcome or supplement the shortcomings of the porous filters and accomplish the desired results of the porous filters in more positive ways, consequently an adequate liquid tight apparatus was developed having appropriate fixtures properly housed within one environment, through which contaminated oil could be forced performing the previously mentioned functions and processes sufficiently well to keep the oil free of harmful contaminants and in the case of motors, in good lubricating quality, without using porosity of any type, in all cases where sand and other internal or external contaminants are not a problem. And in extreme cases where such problems exist the Rectifier may be used with an internal or external porous filter downstream from the Rectifier. In either case without the required replacement of other parts than the filter and without the complete changing of oil, but instead with the gradual oil change, the draining of contaminants periodically at the regular oil change intervals from the sump of the apparatus of an amount equal to 10% to as much as 30% or more of the crankcase capacity in the case of motors, this depending on the type of operation, thus removing these accumulated contaminants then replacing this amount of contaminated oil plus the oil used in the interim with new oil, which is added to the crankcase of the motor; this schedule being predetermined and based either on oil sampling or testing. When a porous filter is used in conjunction with the Rectifier it may need changing at quite infrequent intervals. Tests have shown that the life of these downstream porous filters is from five to ten times normal, since the Rectifier either prevents the formation of most contaminants or removes them before they enter the filter. This then would seem to be the ideal answer to the problem of maintaining lubricating oil in a clean condition and with good lubricating qualities resulting in essentially total protection against failure or breach of warranty in the case of new equipment. In reality this is a new approach to lubrication and machine operation control; that is, draining the worst and adding the best and allowing the motor or machine to build up the quality of the retained oil to get the most benefit from the super refined oil; in short it is substituting the practice of the gradual oil change for the current practice of complete change of oil and filters at frequent intervals. In other types of operations draining should be done as required.

These and other advantages will be better understood when reference is made to the following drawings anad descriptions.

BRIEF DESCRIPTION OF THE DRAWINGS

Here in simple disclosure is presented a number of drawings which illustrate the Rectifier, its Apparatus and Process.

DETAILED DESCRIPTION OF THE RECTIFIER, APPARATUS WITH PROCESS

Figures 1, 2, 3, 4, 5, 6:
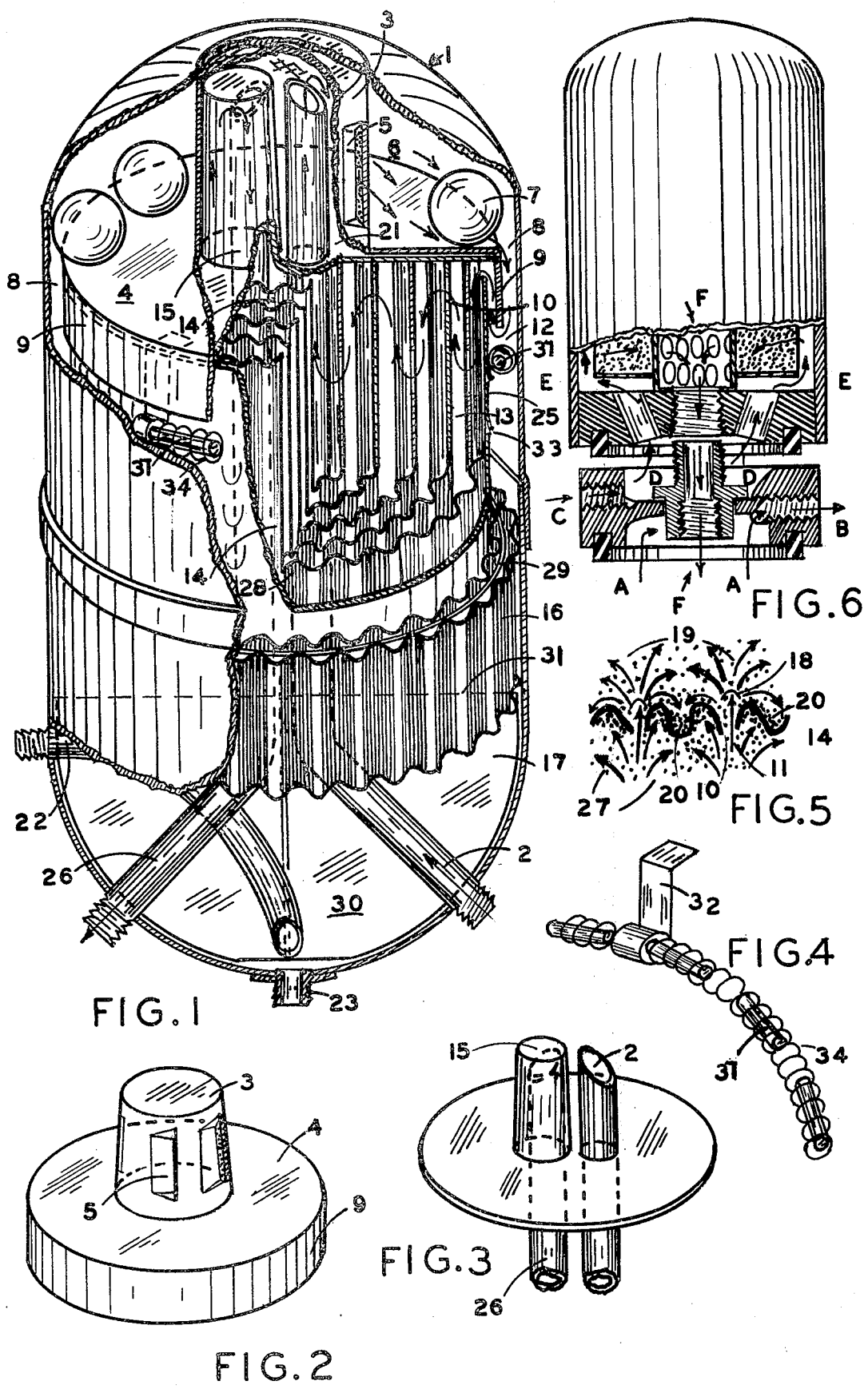
FIG. 1 is a vertical, angular, front, cutaway view of a simple configuration of the Rectifier, showing the casing, the inlet louvered cap and ball race unit, the flanged outlet cone, the metal alloy balls, the spring suspended magnets, the louvered shunt screen, the corrugated and vertically staggered perforated baffle element with bottomly positioned honeycomb separators, the inlet and outlet flow tubes, the bottomly positioned anti-turbulance baffle and the upwardly positioned drain plug with curved tube as well as the alternate bottomly positioned drain plug.
FIG. 2 is a perspective view of the inlet louver cap and ball race floor having a peripheral downwardly extended flange thereabout.
FIG. 3 is also a perspective view, this of the outlet cone with flange, showing in dotted and full lines the position of the inlet and outlet flow tubes as assembled.
FIG. 4 is a view of a section of the helical spring retainer with magnets and retention clip.
FIG. 5 is an enlarged schematic top view of a section of the corrugated baffle cut through the perforations, showing the jet streams, with parabolic profiles and laminar side streams and eddies, also shown are the following flow streams with eddies, and the resultant attraction and accumulation of contaminants on the corrugated attractors.
FIG. 6 is a cross sectional and cutaway view of the sandwich adaptor plate and the conventional throw away type filter as it would be applied down stream from the Rectifier.

Referring then to the drawings FIG. 1 is a vertical cutaway perspective view of my improved Oil Rectifier in its simplest structure. This configuration consists of a liquid tight casing 1 having a centrally positioned attractor element 28, which element consists of concentrically would corrugated attractors 14 with perforations 10, which are vertically staggered, these being separated by honeycomb spacers 16 positioned about the bottom portion thereof, said attractors and spacers being separated by uncorrugated strips 29 to prevent the meshing of said spacers and said atrractors, thus forming a honeycomb like foraminous partition in said casing. Said attractor element 28, being positioned about inlet tube 2 and outlet tube 26, extends upwardly from cross-shaped anti-turbulance baffle 30 which is positioned in sump 17 to prevent the lateral flow of the oil in said sump, and also provide footing for said attractor element 28. Honeycomb spacers 16 in this construction with attractors 14 form a fully cross-sectional foraminous partition 31 separating said upper attractor portion and said sump area 17, through which foraminous partition said contaminants must settle entering said sump. Inlet louvered cap 3 contacts the upper wall of casing 1 and extends downwardly to ball race floor 4 which floor rests firmly on the flange of outlet cone 15 and attractors 14, forcing the oil entering from louvers 5 to flow about floor 4 then through flow channel 8 before entering doughnut circulating chamber 12 and finally perforations 10 in said attractors. Outlet cone 15 is positioned about the upper end of outlet tube 26 within inlet cap 3, the flange of cone 15 extending fully outwardly to contact floor 4 and contain inlet cap chamber 21, said flange being perforated to position inlet tube 2. Alloy balls 7 are positioned in circulating chamber 6 which chamber is formed by louvered cap 3, floor 4, and casing 1.

Oil under pressure enters inlet pipe 2 and flows upwardly therethrough to chamber 21 of louver cap 3. Cap 3 is bottomly articulated to ball race floor 4, the oil then flows through louvers 5 at terrific speed setting up acute centrifugal action in circulation chamber 6 rolling alloy balls 7 about the circumference thereof keeping balls 7 continually polished which is necessary to promote their corrosive action in destroying acid and molecular water. The oil then flows downwardly in flow channel 8 about the periphery of said ball race floor 4 in close proximity to spring 34 which contains magnets 37 and is anchored by clip 32, and articulated flange 9 into doughnut chamber 12 where it equalizes and makes a 180° turn upwardly over shunt shield 25, then downwardly through perforations 10 in attractors 14 thus forming jet flow streams 11 (See FIG. 5.). It then passes through channel 13 and subsequently on through other perforations and other channels, repeatedly until it flows to the center of the Rectifier and then upwardly into outlet cone 15 and finally into outlet tube 26 where it returns to the oil system of the motor or pipe line. It should be noted that the perforations 10 in each succeeding concentric attractor 14 are vertically staggered to increase downward inertia to aid in dislodging heavy contaminants.

As the oil is negotiating its course through the various props in the Rectifier, the above mentioned physical and chemical functions are in full operation, each performing its specific duty in not only ridding the oil of harmful contaminants but permitting it to be super refined in its long exposure to flame, in case of its use in motors, and its long use in certain other equipment, by oxidizing the loose ends of the hydrocarbon chains, thus creating a superior long-chain oil, adding to its viscosity, its film strength, its oiliness, its greasiness, its molasses characteristics and its resistance to weight and heat as well as reducing its volatility.

More specifically, as the oil is forced through inlet tube 2 into inlet cap 3 and chamber 21 of cap 3, pressure is created in the flow stream and the oil escapes through the several louvers 5 in said cap, creating extreme centrifugal action in circulating chamber 6 causing alloy balls 7 to roll violently about the wall of casing 1, and as stated, keeping said balls perpetually polished. These magnesium alloy balls are a neutralizing agent for acid and molecular water as an example when sulphuric acid contacts magnesium the interaction ($Mg+H_2SO4$) becomes ($MgSO4+H_2$) liberating the hydrogen and forming a precipitate. And when water contacts magnesium the results are as follows ($Mg+2H_2O$) becomes ($Mg(OH)_2+H_2$) liberating the hydrogen. Thus both acid and molecular water are no longer problems since these balls are kept polished.

Still other metallic alloy balls such as manganese 30–50% with either copper 50–70% or zinc 50–70% may be used in the ball race to neutralize acid and control gums and resins. The action may be either catalytic or electrolytic, but the desired effect is achieved. These three metals, copper, aluminum, and zinc may be used as pure metals in large areas as parts built into the Rectifier over which the oil must pass to accomplish the same results. As an example the ball race may be made of copper, the attractors may be made of aluminum and the outlet cone may be made of zinc to control gums and resins as well as acid. Tin may also be added in this series.

Also metallic sodium alloyed with lead 50% or tin 50% and upward with at least 20–25% metallic sodium by weight will also act as neutralizing corrosive balls to destroy acid.

Still other combinations may be used, magnesium, aluminum, and tin may be used in an alloy to neutralize acid and water, or manganese and copper or manganese and zinc or metallic sodium and lead may be used as alloys to neutralize acid and control gums and resins, also metallic sodium and metallic potassium to control sulphur; also the apparatus itself may be constructed as stated to contain two or three or more of these pure metals so deployed as metal parts in the internal structure thereof to perform some of these processes; another example may be said inlet and outlet tubes may be of aluminum, said ball race floor of copper, said perforated attractor of zinc, said outlet cone of tin to control acid, gums, and resins.

The extreme centrifugal action in chamber 6 also dislodges globular water and other heavy contaminants casting them to the outside of the flow stream against the casing wall where they settle downward through honeycomb partition 16 into sump 17 where they cannot recirculate. As the oil flows from circulation chamber 6 through flow channel 8 it enters doughnut chamber 12 in a circular laminar flow again dislodging contaminants.

Separate segments of the oil then make right angle turns over shunt shield 25 to enter perforations 10 in corrugated attractors 14, this action again dislodging additional heavy contaminants. As the oil passes through the various perforations (FIG. 5) it is moving at a fast pace forming jet streams 11 with their parabolic profiles 18, their laminar side streams 19, and eddies 20, this resulting in very effective cleaning action.

By observing FIG. 5 which is a schematic view of a section of corrugated attractor baffle 14 showing the action of the oil flow, it is apparent that as these jet streams pass through the attractors they create parabolic profiles 18 therein. This action separates any contaminants that are large enough to be frictionally engageable by the slower movement of the oil in the surrounding laminar streams 19 by shunting them outwardly away from the faster stream center, much as a log is dislodged from the center of a stream, since one side of the log is moving faster than the other side it veers outwardly into the resultant eddies. The contaminants in the oil are also likewise caught in the side swirls of the stream and carried into the eddies 20 and against the attractors where they are cohered to the already amassed contaminants on the attractors. They then build up in loose relationship until their combined weight causes them to travel downward through the honeycomb into the sump, while the cleaner oil flows onward to enter the perforations in the next inward attractor. This action is repeated at each attractor and cleans the oil of essentially all contaminants before it arrives at the center of the apparatus where it must again make a 90° turn upwardly to enter outlet tube 26 thus dislodging additional remaining heavy contaminants.

It should be pointed out that the attractor surfaces, where the accumulation of contaminants occur, are shielded from the extremely rapid flow of the jet streams, in fact the only exposures to such washing action are the edges of the perforations themselves. All other surfaces are not subject to this extreme washing action. Hence the same oil which would tend to pick up contaminants from the internal surfaces of the motor or machine, where it is lashed about previously, will tend to dislodge and deposit these contaminants on surfaces where there is less washing action and increased dwell time. Also in a motor for instance the area where extreme washing action takes place may be only one-fifth as large as the surface area in the Rectifier where these contaminants may be deposited thus assuring efficient cleaning.

It is also observed that the laminar streams and eddies completely cover the full surface of the inner side of the attractors and the following flow streams 27 cover the outer side of the same attractor, thus affording complete contact on both sides thereof.

As the heavy contaminants are being thus separated from the flow streams, the same actions are affording means of separating the submicronic contaminants which cannot be removed by inertia, centrifugal action or gravity. In this action these contaminants are at some time or place brought into contact, or near contact, with the surfaces of the attractors or other surfaces of the Rectifier where they are captured by surface cohesion and bonding, or by electrostatic attraction since they are adsorbants and have a proclivity to acquire an ionic charge of static electricity thereon and are thus attractable to materials of the opposite polarity. They then join the captured contaminants on the surface of the attractors and travel into the sump therewith. It should be pointed out that this surface cohesion is aided by gravitational attraction as a result of the natural bunching of contaminants due to their latching together because of their irregularities and by which they acquire sufficient size to become gravitational centers and are drawn to the massed contaminants on the attractors.

At predetermined intervals these contaminants are purged either through the draining means 22 which consists of a curved tube with the lower end near the bottom of the sump or through drain plug 23 whichever is convenient.

In the case of motors, after the initial filling of the unit, the oil is in continuous circulation therethrough as long as the motor is in operation, the complete crankcase volume passing through about every 30 seconds in a full flow system, with all the various actions and reactions previously described continuously taking place, thus continually processing the oil.

In normal operation after the first few minutes, the oil becomes hot which drastically reduces the viscosity thereof and greatly accentuates molecular movement in the oil, this hot oil is then entering inlet flow tube 2 and passing out flow tube 26 where by conduction and radiation it heats the noncirculating oil in the honeycomb section and the sump which heating greatly facilitates the processes of the unit by allowing freer passage of settling contaminants through this thinner and more molecularly active oil as stated in Stokes formula on sedimentation.

It should be also noted that even when the motor is not running this complete cleaning action continues throughout the Rectifier, sedimentation continues, the downward migration of coalesced contaminants on said attractors and on the walls of the honeycomb partition also continues, as well also the neutralization of acid by the corrosive balls as well as the electrostatic attraction of colloids to the attractors, this as a result of the movement of the oil in small patterns due to molecular action (Brownian movement) by which all parts of the oil are ultimately brought into contact with said elements and attractors. This continued cleaning process, even while the major movement in the oil has stopped, is very important since most motors are idle a great part of the time and since this action cleans much of the oil in the circulating area of Rectifier in any such period as over night for instance. This cleaned oil in the upper part of the Rectifier is then immediately forced back into the motor when the motor is started, as it is replaced by oil from the crankcase. This operation is repeated each time the motor is stopped for any length of time thus continually cleaning and recleaning that part of the oil which is contained in the upper part of the Rectifier.

As stated the conglomerate formed in the sump is finally periodically purged by pressure through the evacuating means while the motor is running, this drained oil with whatever oil is used in the interim in the combustion cycle is then replaced by new oil which is added to the crankcase. Hence the repeated circulation of the oil through the instant apparatus with these process continually taking place, whether the motor is running or not, keeps the oil in good lubricating quality at all times in normal operations; however, as stated, a down stream conventional filter may be deployed to safeguard against ingestation of unusual amount of sand or metal, or to insure against warranty cancellation in the case of new equipment.

The result is a clean super refined oil which oil has actually acquired several added qualities it did not have as new oil and cannot attain when only conventional filters are used since only part of the contaminations are removed and the oil loses its film strength as a result of contamination. It has more oiliness, it has higher viscosity, it adheres more tenaciously to metal surfaces, it has greater film strength, it resists higher heat and heavier loads before breaking down, it maintains a thicker oil film thus preventing abrasion, it prevents blow-by in the combustion chamber and it is less volatile since all volatile materials have long since been burned out, thus it reduces smog and prevents exhaust smoke as well as reduces the amount of oil actually consumed in the combustion cycle. The result is an oil of high lubricating quality which prevents wear in the motor and greatly adds to fuel efficiency because of higher compression which results in more delivered horsepower and more miles per gallon fuel. The draining schedule is determined by tests of the viscosity, the total contaminate content, and the dilution factor. Viscosity should not be allowed to increase more than 50–60% above that of the new oil used. Total contaminants even though they are below 3 microns in size should not go above 2%. Dilution should not go above 3%. Any knowledgeable operators can soon learn to judge the condition of the oil by simple tests using a Viscometer or even by the dip stick and can alter his draining schedule to drain more or less as the condition indicates. Field experience has provided rule of thumb draining schedules depending on the type of operation, equipment and environs and ranges between 10–30% of crankcase capacity at normal standard draining periods.

The ultimate result then is an oil of high lubricating quality which prevents unnecessary wear, thus lengthening the life of the motor, and materially adding to fuel economy and the prevention of ecological contamination.

Many of these advantages are to varying extents also true in other types of operations, such as compressors and in-line oil recirculation systems.

As previously stated, when the drainage schedule has been adhered to the Rectifier used alone is abundantly ample to keep the oil in good lubricating quality, thus to elongate the life of the motor or machine in any normal circumstances. In numerous instances the motor life of cars has been extended to 200,000 miles or more without overhaul and in diesel trucks to 400,000 miles or more without overhaul or complete change of oil, all without the loss of efficiency, many with actual increase of mileage per gallon of fuel of up to as much as 20% or more.

However, as stated, in extreme cases of contamination or on new equipment where a thorough cleaning has not been provided by the manufacturer or where the equipment is under warranty, the original filtering system may be retained, a sandwich full flow adaptor plate provides for the use of the Rectifier with the original equipment in tact. When this arrangement has been used with the Rectifier upstream from the standard filter, as stated, the standard filter lasts from 5–10 times as long since the Rectifier does the major portion of the work.

FIG. 6 shows the schematic of the flow of oil through the sandwich adaptor plate and the throwaway filter. Oil from the motor enters the adaptor plate as A-flows to the Rectifier at B-returns from the Rectifier at C-enters the throwaway filter at D and into the filtering element at E, finally returning to the motor at F.

It should be noted that the use of the magnets in the helical spring which is clamped at spaced intervals to the internal props of the Rectifier adds a very positive self cleaning action to these magnets. As iron particles build up on the magnets the whisker-like formations are washed downwardly as a result of the acute flow of the oil as it passes about the flange of the ball race and as these whiskers are extended they finally break loose and settle into the honeycomb and into the sump. The vibration of the equipment and the turbulence of the flow stream also causes the spring and magnets to vibrate aiding in this dislodging action, resulting in self cleaning the magnets.

The features of the instant apparatus and processes are new, novel, and useful; they constitute a decided advance in cleaning oil. These features used in toto or in part or in various sizes and different arrangements or with altered parts serving the same purpose, are within the spirit of this invention. The embodiments shown do not limit the broad features of the apparatus and processes claimed, but are only exemplary and other embodiments including modified forms of these essential parts and processes may be resorted to without departing from the spirit of my invention or the scope of the subjoined claims.

I claim:

1. A liquid rectifying apparatus for the catalyzing, neutralizing, trapping, and finally removing or otherwise destroying the dispersed-phase from the continuous phase of a contaminated liquid dispersion, particularly industrial oils and lubricating oil in use in a motor, said dispersed-phase consisting of both soluable and insoluable contaminants such as sand, dirt, metal particles, carbon, acid, sulphur, gums, resins, ash, water, coolant, and other foreign materials of molecular and larger sizes all of which are widely dispersed in said oil and part of which are ionized, said apparatus comprising:

a generally cylindrical pressure tight casing having a generally vertically extended longitudinal axis, an essentially medial fully cross-sectional honeycomb-like foraminous partition horizontally oriented in said casing, said foraminous partition being comprised of essentially non-porous material having said foramina essentially vertical therein and cooperating with the upper portions of said confined area in said casing to define generally an upper fully cross-sectional circulating area and with the lower portion of said confined area in said housing to define a bottomly positioned fully cross-sectional sludge sump, said foramina being so deposed as to allow contaminants to settle therethrough, moving from said circulating area into said sump;

inlet means mounted in said housing for introducing contaminated oil into a circulating chamber in the upper portion of said circulating area, said inlet means disposed so as to establish whirling flow of said oil within said circulating chamber to generate forces for displacing said heavy contaminants generally outwardly within said circulating chamber;

a series of concentric attractor baffles extending upwardly from said foraminous partition into the lower portion of said circulating area, said baffles being corrugated and having perforations therethrough, said baffles defining impingement surfaces for said coarse or ionized colloidal contaminants to facilitate the separation by sedimentation, electrostatic attraction, and cohesive bonding of said contaminants;

a doughnut shaped circulating chamber positioned about said concentric attractor baffles being defined by said baffles on its inner limits, by said housing on the outer and upper limits and said foraminous partition at its lower limits;

outlet means mounted in said housing generally centrally of said circulating chamber for removing said continuous phase oil after the separation of said dispersed-phase contaminants;

said sludge sump for receiving said settling contaminants after they have passed through said foraminous partition;

outlet and inlet flow tubes centrally positioned and fully extended between the housing in said sump to the exact top of said circulating area thus preventing any appreciable drainback of said liquid when the system is not in operation since both the outlet and the inlet tube endings are well within the upper limits of said casing;

a centrally located louvered cap positioned above and a but the upper ends of said outlet tubes, said cap being articulated at its lower periphery to the floor of said circulating chamber, said floor also having at its outer periphery a downwardly extending flange thereabout, said louvers which are positioned in the side wall of said cap being so deposed as to set up acute centrifugal movement in the liquid entering said circulating chamber;

a flanged outlet cone positioned within said louvered cap and over and about said outlet tube, said flange extending outwardly on all sides contacting the lower surface of the floor of said circulating chamber chamber forming a seal therewith, thus creating a pressured inlet chambaer within said louvered cap;

said circulating chamber being defined on the lower portion by a floor, on its outer and upper portion by the walls of the casing and on its inner portion by the wall of said louvered cap, this configuration constituting a ball race having during operation extreme centrifugal movement in the liquid therein which enters the louvers and escapes downwardly about the outer periphery of the floor thereof, said ball race floor being positioned on said attractor baffles;

said ball race having a number of self cleaning inarticulated balls contained therein, said balls being constituted of various metal alloys having neutralizing and catalyzing properties inherent therein, said balls during operation being violently rolled about said race, keeping them highly polished thus assuring their reacting capabilities;

an anti-turbulance baffle of three or more blades positioned fully across the sump thereof extending fully upwardly to become the support means of the attractor element, but not extending completely to the lower extremity of the sump but resting on the curved side walls thereof;

draining means in said housing in said sump area to facilitate the removal of said contaminants.

2. The apparatus as claimed in claim 1 in which said metallic alloy balls may consist of two or more metals of several combinations using such metals as magnesium, aluminum, tin, zinc, copper, metallic sodium, metallic potassium, lead, magnesium, and calcium as examples; magnesium, aluminum, and tin may be used in an alloy to neutralize acid and water, or manganese and copper or manganese and zinc or metallic sodium and lead may be used as alloys to neutralize acid and control gums and resins, also metallic sodium and metallic potassium to control sulphur; also the apparatus itself may be constructed to contain two or three or more of these pure metals so deployed as metal parts in the internal structure thereof to perform some of these processes, as an example: said inlet and outlet tubes may be of aluminum, said ball race floor of copper, said louvered cap and floor of zinc, said concentric attractor baffles of tin to control acid, gums, and resins.

3. The apparatus of claim 1 having vertically staggered perforations in said concentric attractor baffles.

4. The apparatus of claim 1 having helical spring contained magnets positioned about the periphery of said ball race flange in said doughnut shaped circulating chamber.

5. The apparatus of claim 1 having a shunt shield with bottomly opened louvers therein positioned about said attractors adjacent inwardly to said ball race flange.

6. The apparatus of claim 1 having a sandwich type full flow adaptor plate so deployed as to flow said oil through said Rectifier before it passes through an attached porous filter.

7. A liquid rectifying apparatus for the catalyzing, neutralizing, trapping, and finally removing or otherwise destroying the dispersed-phase from the continuous phase of a contaminated liquid dispersion, particularly lubricating oil in use in a motor, said dispersed-phase consisting of both soluable and insoluable contaminants such as sand, dirt, metal particles, carbon, acid, sulphur, gums, resins, ash, water, coolant, and other foreign materials of molecular and larger sizes all of which are widely dispersed in said oil and part of which are ionized, said apparatus comprising:

a generally cylindrical pressure tight housing having a generally vertically extended longitudinal axis;

an essentially medial fully cross-sectional honeycomb-like faraminous partition horizontally oriented in said housing, said foraminous partition being comprised of essentially non porous material having said foramina essentially vertical therein and cooperating with the upper portions of said confined area in said housing to define generally an upper fully cross-sectional circulating area and with the lower portion of said confined area in said housing to define a bottomly positioned fully cross-sectional sludge sump; said foramina being so deposed as to allow settling contaminants therethrough moving from said circulating area into said sump;

inlet means mounted in said housing for introducing contaminated oil into said circulating area through said louvered cap, said inlet means disposed so as to establish whirling flow of said oil within said circulating area and ball race to generate forces for displacing said heavy contaminants generally outwardly within said circulating area;

a series of concentric attractor baffles extending upwardly from said foraminous partition to the top of said circulating area, said baffles having staggered perforations therethrough, said baffles defining impingement surfaces for said coarse or ionized colloidal contaminants to facilitate the separation by sedimentation, electrostatic attraction, and cohesive bonding of said contaminants;

a doughnut shaped circulating chamber positioned about said concentric attractor baffles being defined by said baffles on its inner limits, by said housing on the outer and upper limits and said foraminous partition at its lower limits;

a shunt screen having bottomly opened louvers therethrough a series of helical spring contained magnets positioned in said doughnut shaped circulating chamber before the flange of said ball race floor;

outlet means mounted in said housing generally centrally of said circulating chamber for removing said continuous phase oil after the separation of said dispersed-phase contaminants;

said sludge sump for receiving said settling contaminants after they have passed through said foraminous partition; and draining means in said housing in said sump area to facilitate the removal of said contaminants.

* * * * *